H. MAYER.
WHEEL.
APPLICATION FILED MAY 31, 1910.
1,001,058.
Patented Aug. 22, 1911.
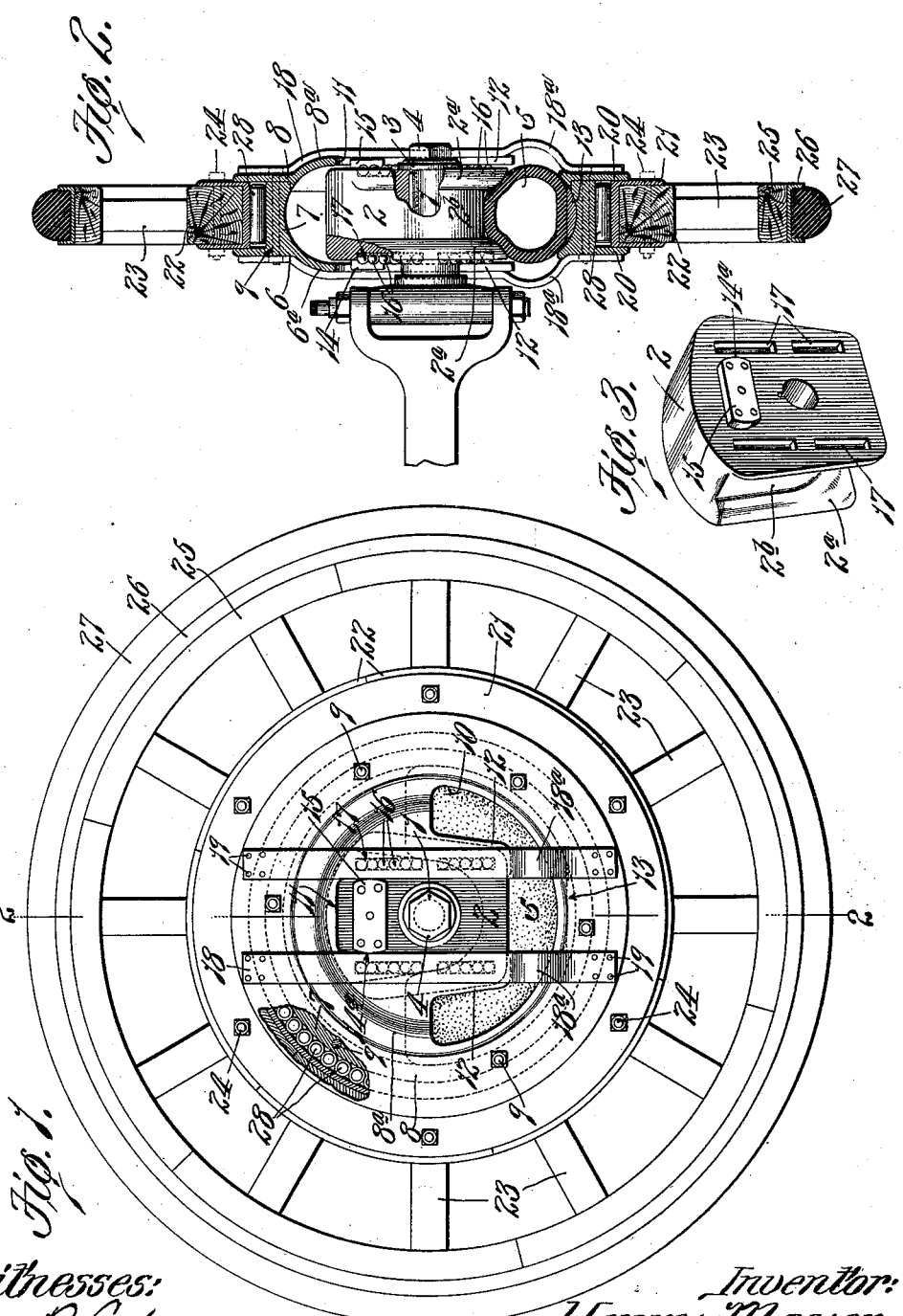

UNITED STATES PATENT OFFICE.

HENRY MAYER, OF ST. LOUIS, MISSOURI, ASSIGNOR OF ONE-HALF TO FREDERICK MAYER, OF ST. LOUIS, MISSOURI.

WHEEL.

1,001,058.  Specification of Letters Patent.  Patented Aug. 22, 1911.

Application filed May 31, 1910. Serial No. 564,258.

*To all whom it may concern:*

Be it known that I, HENRY MAYER, a citizen of the United States, residing at the city of St. Louis, State of Missouri, have invented a certain new and useful Improvement in Wheels, of which the following is a specification, reference being had to the accompanying drawings, forming a part hereof, of which—

Figure 1 is a side elevational view, partly in section, of a wheel embodying my invention; Fig. 2 is a sectional view on the line 2—2, Fig. 1; and Fig. 3 is a perspective view of the member adapted to receive and accommodate the upper face of the cushion-member.

This invention relates to a new and useful improvement in wheels, and more particularly in wheels adapted to pneumatically or resiliently support the body of the vehicle with which the wheel may be arranged.

Heretofore, with wheels of this class provided with pneumatic tires on their outer rim or tread portion, much trouble and expense have been experienced due to the puncturing and rapid wear of the tires. Many efforts have been made to obviate this trouble and expense, not only by varying the construction of the tires themselves, but also by varying the construction of the wheel proper, as shown, for instance, in Letters Patent No. 952,012, granted to me March 15, 1910, the pneumatic or cushioning member being arranged away from the outer rim or tread. While it is true that the puncturing of tires in such wheels having the pneumatic or cushioning member arranged away from the rim or tread is thereby prevented, yet such wheels, so far as I am aware, have been, generally speaking, faulty in construction, not possessing sufficient resilient qualities to properly resiliently support the vehicle.

The object of my invention is, therefore, to provide a wheel in which the pneumatic or cushioning member is not only arranged away from the tread or outer rim of the wheel, so as not to be in contact with the ground or other surface upon which the wheel rests and moves, but which also possesses great resilient qualities and adapted accordingly to properly resiliently support the vehicle with which the wheel may be used.

With this object in view, my invention resides in the novel construction of the several parts thereof and in the novel arrangement and combination of the same, all as will hereinafter be described and afterward pointed out in the claims.

In the drawings, wherein like reference characters refer to like parts throughout the several views, 1 indicates an axle or other supporting-member upon which the body of the vehicle is adapted to be suitably mounted. Keyed or otherwise suitably fastened on said axle or supporting-member 1 is a member 2, the end of said axle or supporting member being, as usual, preferably threaded to receive the usual retaining washer 3 and nut 4. This member 2 at its sides is flat and is preferably of a shape somewhat like a key-stone, being preferably curved and wider at its upper portion than at its lower portion, and may be of wood or any other suitable material. Extending from one side to the other side of said top portion and completely around said lower portion, said member 2 is preferably cut-out or hollowed, thereby providing the side flanges 2$^a$ and hollow or groove 2$^b$ adapted to receive and accommodate the upper face of a preferably semi-circular air-cushion 5, see Fig. 1, said groove or hollow 2$^b$ being preferably of gradually increasing depth from the sides of said top portion of member 2 toward said lower portion thereof and being accordingly deeper in said lower portion than at the sides of said top portion. Arranged on said axle or supporting-member 1 and inclosing and surrounding said member 2 and air-cushion 5 is a casing comprising a side plate 6 having preferably an integral thickened annular portion or bearing-ring 7 and a side plate 8, said plates 6 and 8 being suitably secured together, as by through-bolts 9, and the upper face of said bearing-ring 7 being preferably flat, for purposes hereinafter appearing. The plates 6 and 8 preferably bulge outwardly in their central portions within the area of said ring 7, as at 6ª and 8ª, respectively, see particularly Fig. 2; and said plates 6 and 8, within the area of said ring 7, are each similarly cut-away as shown particularly in Fig. 1, each of said plates being provided with a substantially semi-circular cut-out portion as at 10, extending substantially around the lower half thereof, and with a vertically-disposed cut-out portion or enlarged slot, as at 11. The said cut-out portions 10 and 11 are preferably continuous or connecting, and, the lower portion of said slot 11 being between the ends of said semi-circular cut-out portion 10, there are thereby provided what might be called downwardly-extending tongues or bearing-portions 12, for purposes hereinafter appearing. The diameter of ring 7 varies according to the size of said air-cushion 5, said air-cushion 5, when properly inflated, being adapted to fit, at its upper face, in said hollow or groove 2ᵇ, as before stated, and to bear, at its lower face, on said ring 7. Should the inner face of said ring 7 be curved, as shown herein, a segmental section 13 of wood or other suitable material and of the proper size is preferably interposed between said cushion and ring to increase the bearing-surface for said cushion.

The axle or supporting-member 1 being dead or stationary and not adapted to rotate and member 2 being fixed thereon, said member 2 is prevented from moving laterally on said axle or supporting-member 1 and may also be said to be non-rotatable. The said casing comprising said plates 6 and 8 and bearing-ring 7 is also, as will clearly be seen, prevented by said member 2 moving laterally relative to said axle or supporting-member 1; and to prevent said casing rotating relative to said member 2, I suitably secure to the sides of said member 2 suitable preferably metallic plates 14 and 15 adapted to fit in and coöperate with the walls of said vertically-disposed slots 11 in said plates 6 and 8, respectively, whereby, while said casing may thus move vertically relative to said member 2, rotary movement thereof relative to said member 2 is thereby prevented. Said plates 14 and 15 are preferably of such a length that a slight space or clearance is provided therebetween and the vertical sides of said slots 11, and the ends of said plate 14 and 15 are preferably rounded, as at 14ª, Fig. 1, whereby should the wheel be subjected to a shock or jar and the same be taken up by the ends of said air-cushion 5, said casing is also permitted to sufficiently swing or move horizontally relative to said member 2 to allow said cushion free play to resiliently take up such shock or jar. Said cushion 5, as will be plain, serves also to maintain said casing and member 2 in proper relation one to the other; and in order that said casing may freely and with no unnecessary friction thus move, as it might be said, otherwise than rotatorily relative to said member 2 to permit said air-cushion 5 full play to resiliently take up any shocks or jars to which the wheel may be subjected, and at the same time to steady and prevent any wabbling of said casing when so moving relative to said member 2, I interpose between the sides of said member 2 and said plates 6 and 8 and preferably on each side of said axle or supporting-member 1 suitable anti-friction devices, such as the rollers or balls 16, the sides of said member 2 being provided with suitable grooves 17 in which said rollers or balls 16 are adapted to loosely fit. As is obvious, said rollers or balls 16 may be arranged in continuous rows or series, or in broken rows or series as shown in dotted lines in Fig. 1. By this construction, said casing is steadied and prevented from wabbling on said member 2 and may yet move, as described, otherwise than rotatorily relative to said member 2 freely and with no unnecessary friction. The said plates 6 and 8 and bearing-ring 7 are preferably of any suitable metallic material, and, if desired, said plates 6 and 8 may be strengthened or reinforced, as by preferably metallic strips 18, said strips 18 being suitably secured, as by rivets 19, to said plates and being each provided with an outwardly curved or bulging portion 18ª coincident with said semi-circular cut-out portion 10 of said plates. The said plates 6 and 8 extend outwardly beyond said ring 7, so as to provide the preferably integral annular retaining flanges 20 for the rotatable tread portion of the wheel. This rotatable tread portion comprises preferably an annular grooved or channeled member 21, in which is adapted to be arranged a series of segmental filler blocks 22 from which the spokes 23 radiate, said blocks 22 being preferably held in position in said member 21 in any suitable manner, as by rivets or bolts 24. On the outer ends of spokes 23 are arranged segmental felly members 25, and surrounding and secured on said felly members 25, which are preferably of wood, is a metallic channel-shaped rim 26, in which is suitably arranged preferably an ordinary solid rubber or cushion tire 27. Suitable anti-friction rollers or other anti-friction devices 28 are preferably interposed between said member 21 and ring 7, whereby said tread portion may freely rotate on said ring 7.

From the foregoing, it will be readily seen that a construction is provided wherein not only is the air-cushion or pneumatic tire, so to speak, away from the ground or other surface upon which the wheel rests and moves, thereby obviating the present danger of "punctures," but in which also, the said casing being permitted to freely move, as described, otherwise than rotatorily relative to said member 2, the said air-cushion 5 is allowed full play to take up any shocks or jars to which the wheel may be subjected, whereby all the resilient qualities of said air-cushion may be utilized to properly resiliently support the body of the vehicle with which the wheel may be used, the said semi-circular cut-out portions 10 of said side plates 6 and 8 permitting said air-cushion to freely spread, as required.

I am aware that minor changes in the construction, arrangement, and combination of the several parts of my wheel may be made and substituted for those herein shown and described without departing from the nature and principle of my invention.

Having thus described my invention, what I claim and desire to secure by Letters Patent is:

1. A wheel comprising a non-rotatable member, a casing comprising side-plates and an annular bearing-ring loosely inclosing and surrounding said member, said side-plates being provided with vertically-disposed slots, plates on said member adapted to fit in and coöperate with the walls of said slots, whereby said casing is prevented from rotating, but is free to move vertically, relative to said member, anti-friction devices between said side-plates and said member, an air-cushion in said casing between said ring and said member and adapted to resiliently support said casing relative to said member, said side-plates being also cut-away to accommodate outward spreading of said air-cushion, a tread-portion rotatable on said ring, and anti-friction devices between said ring and tread-portion; substantially as described.

2. A wheel comprising a non-rotatable member, a casing comprising side-plates and an annular bearing-ring loosely inclosing and surrounding said member, said side-plates being provided with vertically-disposed slots, plates having rounded ends on said member and adapted to fit in, and coöperate with the walls of, said slots, whereby said casing is prevented from rotating, but is free to swing and vertically move, relative to said member, anti-friction devices between said side-plates and said member, an air-cushion in said casing between said ring and said member and adapted to resiliently support said casing relative to said member, a tread-portion rotatable on said ring, and anti-friction devices between said ring and said tread-portion; substantially as described.

3. A wheel comprising a non-rotatable member, a casing comprising side-plates and an annular bearing-ring loosely inclosing and surrounding said member, said side-plates being provided with vertically-disposed slots, plates on said member adapted to fit in and coöperate with the walls of said slots, whereby said casing is prevented from rotating, but is free to move vertically, relative to said member, anti-friction devices between said side-plates and said member, a substantially semi-circular air-cushion in said casing between said ring and said member and adapted to resiliently support said casing relative to said member, said side-plates being also provided with substantially semi-circular cut-out portions adapted to permit the spreading of said air-cushion, a tread-portion rotatable on said ring, and anti-friction devices between said ring and said tread-portion; substantially as described.

4. A wheel comprising a non-rotatable member, a casing comprising side-plates and an annular bearing-ring loosely inclosing and surrounding said member, said side-plates being provided with vertically-disposed slots, plates having rounded ends secured on the sides of said member and near the top thereof, said plates being adapted to fit in, and coöperate with the walls of, said slots, whereby said casing is prevented from rotating, but is free to swing and vertically move, relative to said member, anti-friction devices between said side-plates and said member, a substantially semi-circular air-cushion in said casing between the lower portion of said member and said ring and adapted to resiliently support said casing relative to said member, said side-plates being also provided with substantially semi-circular cut-out portions adapted to permit the spreading of said air-cushion, a tread-portion rotatable on said ring, and anti-friction devices between said ring and said tread-portion; substantially as described.

5. A wheel comprising a non-rotatable member, a casing comprising side-plates and an annular bearing-ring loosely inclosing and surrounding said member, said side-plates being provided with vertically-disposed slots, plates having rounded ends secured on the sides of said member and near the top thereof, said plates being adapted to fit in, and coöperate with the walls of, said slots, whereby said casing is prevented from rotating, but is free to swing and vertically move, relative to said member, anti-friction devices between said member and said side-plates, a substantially semi-circular air-cushion in said casing between said ring and said member and adapted to resiliently support said casing relative to said member, said side-plates being provided with substantially semi-circular cut-out portions adapted to permit the spreading of said air-cushion, a tread-portion rotatable on said ring, anti-friction devices between said ring and said tread-portion, and reinforcing strips on said side-plates provided with outwardly-curved portions coincident with said semi-circular cut-out portions in said side-plates; substantially as described.

In testimony whereof, I have signed my name to this specification in the presence of two subscribing witnesses.

HENRY MAYER.

Witnesses:
GEORGE C. EICHBAUM,
CAROLINE L. WEBER.

Copies of this patent may be obtained for five cents each, by addressing the "Commissioner of Patents, Washington, D. C."